US012101683B2

(12) United States Patent
Sholev et al.

(10) Patent No.: US 12,101,683 B2
(45) Date of Patent: Sep. 24, 2024

(54) PROXIMITY DETECTION USING WI-FI CHANNEL STATE INFORMATION

(71) Applicant: Intel Corporation, Santa Clara, CA (US)

(72) Inventors: Omer Sholev, Rishon Lezion (IL); Ofir Degani, Ha (IL); Elan Banin, Raanana M (IL); Uri Parker, Shimshit (IL); Assaf Gurevitz, Ramat Hasharon M (IL)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 17/129,702

(22) Filed: Dec. 21, 2020

(65) Prior Publication Data

US 2021/0112371 A1   Apr. 15, 2021

(51) Int. Cl.
*H04W 4/02* (2018.01)
*H04W 84/12* (2009.01)

(52) U.S. Cl.
CPC ............ *H04W 4/023* (2013.01); *H04W 84/12* (2013.01)

(58) Field of Classification Search
CPC ....... H04W 4/02; H04W 64/00; H04W 84/12; H04W 4/80; H04W 24/02; H04W 12/06; H04W 12/71; H04W 1/12; H04W 1/06; H04L 25/02; H04L 5/00; H04L 12/02; H04L 12/46; H04L 1/00; H04L 25/49; H04L 25/03; H04B 7/06; H04B 7/04; H04B 7/02; H04B 17/34; H04B 70/45

USPC ......................................................... 370/338
See application file for complete search history.

(56) References Cited

U.S. PATENT DOCUMENTS

| | | | |
|---|---|---|---|
| 7,251,637 B1* | 7/2007 | Caid ....................... G06F 16/58 |
| | | | 706/26 |
| 8,831,067 B2* | 9/2014 | Chen ..................... H04L 1/0026 |
| | | | 375/267 |
| 10,763,935 B2* | 9/2020 | Akoum .................. H04B 7/063 |
| 10,873,370 B2* | 12/2020 | Kuchi ................... H04L 5/0023 |
| 11,025,310 B2* | 6/2021 | Davydov ............... H04B 7/063 |
| 11,115,240 B2* | 9/2021 | Zhang ................. H04L 25/0248 |
| 11,500,058 B2* | 11/2022 | Hu ......................... G01S 13/003 |
| 11,509,363 B2* | 11/2022 | Timo ................... H04B 7/0456 |
| 11,588,530 B2* | 2/2023 | Wu ...................... H04B 7/0417 |
| 11,728,851 B2* | 8/2023 | Timo .................. H03M 7/6047 |
| | | | 375/262 |
| 11,887,007 B2* | 1/2024 | Choi ........................ G06N 3/04 |
| 2022/0385343 A1* | 12/2022 | Cai ...................... H04B 7/0663 |
| 2023/0231605 A1* | 7/2023 | Fröberg Olsson .... H04L 1/0003 |
| | | | 370/329 |

OTHER PUBLICATIONS

EPO Extended European Search Report dated Mar. 28, 2022, pp. 1-9.

(Continued)

*Primary Examiner* — Man U Phan
(74) *Attorney, Agent, or Firm* — Schwabe, Williamson & Wyatt, P.C.

(57) ABSTRACT

Among other things, embodiments of the present disclosure help to overcome environment-specific dependency issues of conventional Wi-Fi-based sensing systems, thus allowing a neural network to make better proximity predictions in an unseen environment. Other embodiments may be described and claimed.

20 Claims, 15 Drawing Sheets

(56) References Cited

OTHER PUBLICATIONS

Adege Abebe Belay et al: "Mobility Predictions for IoT Devices Using Gated Recurrent Unit Network", IEEE Internet of Things Journal, IEEE, USA, vol. 7, No. 1, Oct. 17, 2019 (Oct. 17, 2019), pp. 505-517, XP011764971, DOI: 10.1109/JIOT.2019.2948075 [retrieved on Jan. 9, 2020].

Feng Chunhai et al: "Wi-Multi: A Three-Phase System for Multiple Human Activity Recognition With Commercial WiFi Devices", IEEE Internet of Things Journal, IEEE, USA, vol. 6, No. 4, Aug. 1, 2019 (Aug. 1, 2019), pp. 7293-7304, XP011737535, DOI: 10.1109/JIOT.2019.2915989 [retrieved on Jul. 31, 2019].

Ma Yongsen Yma@CS WM EDU et al: "WiFi Sensing with Channel State Information", ACM Computing Surveys, ACM, New York, NY, US, US, vol. 52, No. 3, Jun. 18, 2019 (Jun. 18, 2019), pp. 1-36, XP058666612, ISSN: 0360-0300, DOI: 10.1145/3310194.

Mohammed Alloulah et al: "On Tracking the Physicality of Wi-Fi: A Subspace Approach", arxiv.org, Cornell University Library, 201 Olin Library Cornell University Ithaca, NY 14853, Oct. 10, 2018 (Oct. 10, 2018), XP080923359.

\* cited by examiner

PROXIMITY DETECTION USING WI-FI CHANNEL STATE INFORMATION

FIELD

Embodiments of the present invention relate generally to the technical field of wireless communications.

BACKGROUND

Wi-Fi-based sensing involves tracking or detecting the movement of people or objects. Wi-Fi based sensing utilizes variations in the measured wireless channel and therefore it is also non-intrusive. The collected measurements are typically used by a digital signal processor (DSP) and/or artificial intelligence (AI)-based algorithm to make predictions and estimations. However, since wireless channels are location-specific, AI-based solutions may suffer from a lack of generalization (e.g., due to limited number of training scenarios). Embodiments of the present disclosure address these and other issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
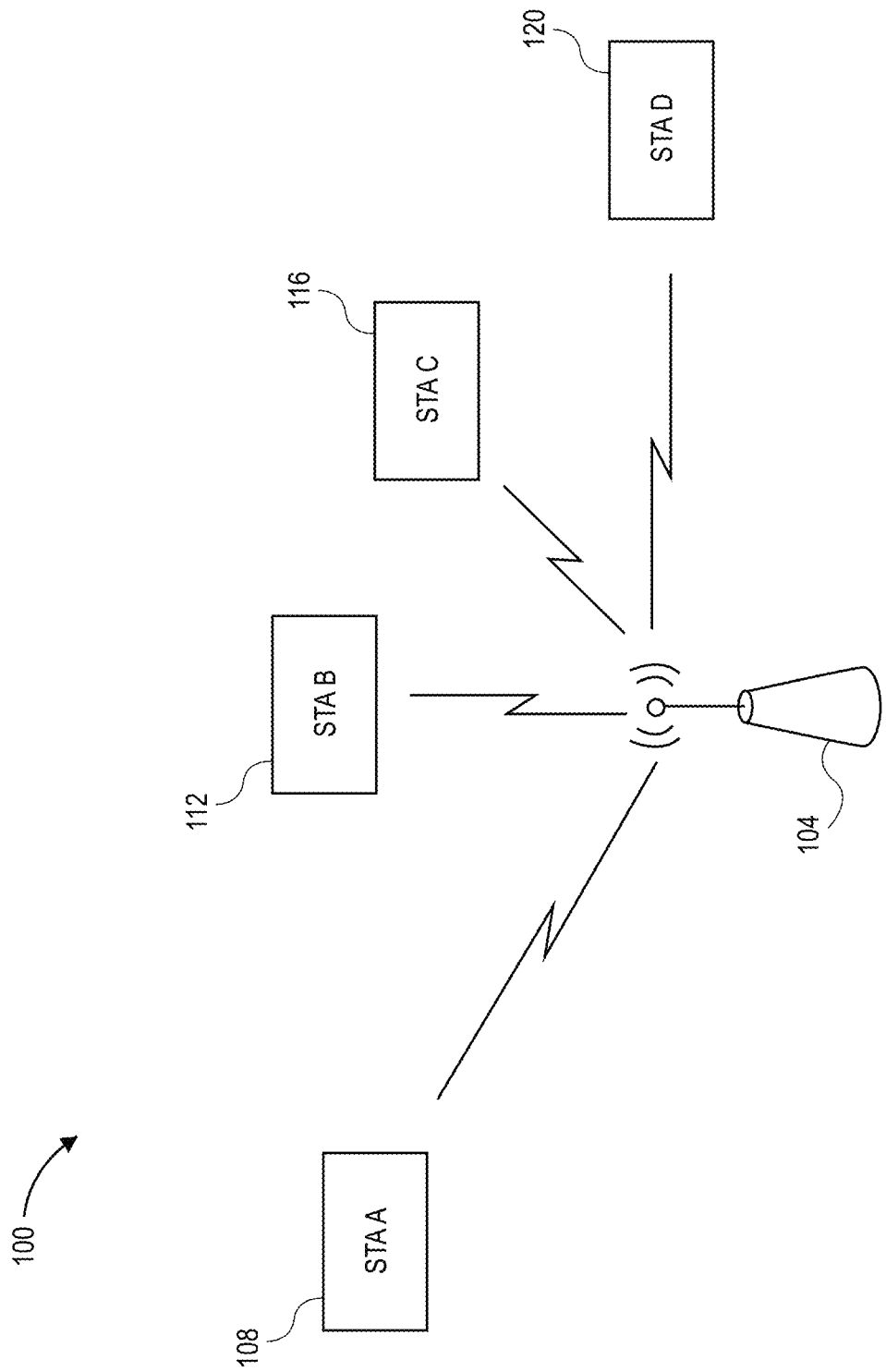
FIG. 1 illustrates an example of a network in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details.

In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

As noted above, Wi-Fi-based sensing involves tracking or detecting the movement of people or objects. However, AI-based algorithms for Wi-Fi-based sensing are often prone to generalization problems when the set of input features used for training is different than the ones used for inference. This can be problematic since it is often not possible to cover all possible environments in the training stage. Furthermore, feeding directly the raw CSI data to an AI algorithm usually requires many parameters and/or a complex model and may still lack generalization capabilities. Known processing methods for removing location specific patterns from the data may still require training a complex AI model, which in turn requires considerable time and resources.

For example, conventional systems using a neural-network-based model typically use preprocessing techniques in order to remove location specific features from the data and feed a large complex NN, usually a Convolutional neural network (CNN). Such systems typically feed a CNN with the raw data and re-train the model using new measurements at each new location where system is deployed. When using a DSP-based algorithm, conventional systems typically use new measurements at each new location where system is deployed and adjust thresholds and/or metrics. In such systems, however, the CNN models are often expensive in resources for training and inference. Additionally, readjusting the algorithms parameters/thresholds is likewise expensive in time and resources, and further delays the validity of the proximity-feature for the user.

As described in more detail below, embodiments of the present disclosure help to overcome environment-specific dependency issues of conventional systems, thus allowing a NN to make better proximity predictions in an unseen environment. Embodiments of this disclosure can also yield a small compact set of features from the raw measurements allowing the usage of a less complex AI model compared to conventional systems. Some embodiments of the disclosure are based upon a covariance matrix of raw measurements followed by a singular value decomposition (SVD), which yields a general set of features (singular values) highly correlated with proximity. This set of features is then fed to a feed-forward NN to optimally combine them for proximity detection. Among other things, embodiments of the present disclosure can extract a small meaningful set of features which allows a simple NN to make reliable predictions in an unseen environment without the need to re-calibrate the model parameters, as required in conventional systems.

FIG. 1 illustrates a network 100 in accordance with some embodiments. The network 100 may include an AP 104 communicatively coupled with a plurality of stations (STAs) including, for example, STA A 108, STA B 112, STA C 116, and STA D 120. The network 100 may be a wireless local area network (WLAN) that is compatible with IEEE 802.11 protocols. In some embodiments, the network 100 may also be referred to as a basic service set (BSS). In some embodiments, the AP 104 and STAs may communicate based on high-efficiency wireless (HEW) protocols defined in, for example, IEEE 802.11ax. STAs operating based on high-efficiency (HEW) protocols may also be referred to as HEW or high-efficiency (HE) STAs.

In some embodiments, the AP 104 may communicate with one or more STAs (e.g., laptops, personal computers, mobile computing devices, etc.) for Wi-Fi sensing where Wi-Fi CSI data is collected periodically (e.g., every ~100 ms) by the STA to be used for proximity/range detection to the STA (also referred to herein as a "device"). The characteristics and variations in the measured CSI contain information about the distance of an object from the device. The CSI absolute value measurements are aggregated in a time window to yield a [time-frequency] matrix where each row corresponds to a single CSI.

Figure 2A:
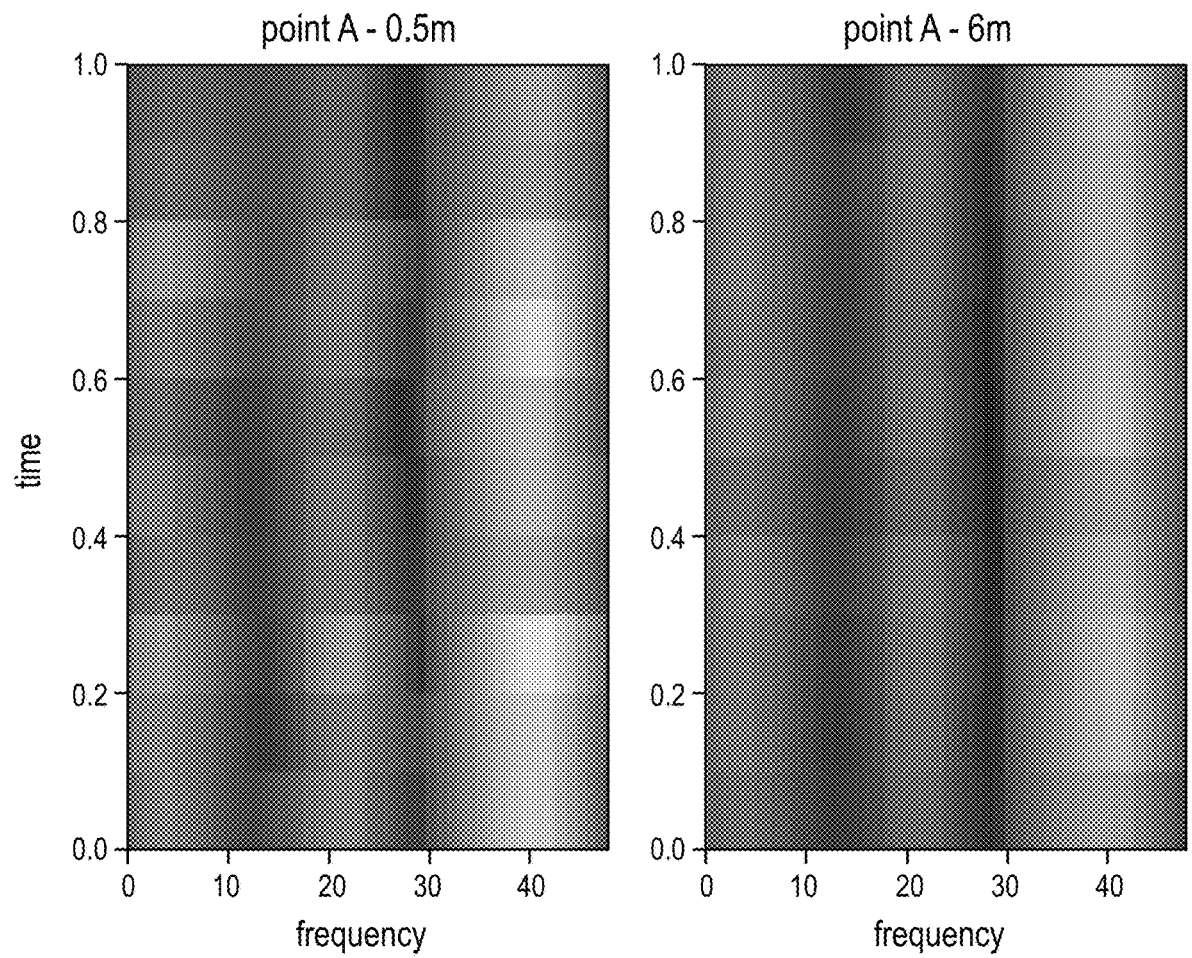
FIGS. 2A and 2B illustrate examples of channel state information (CSI) time-frequency matrices in accordance with some embodiments.

FIG. 2A illustrates an example of two such matrices, both recorded in the same environment (noted as Point 'A'). In the left matrix, the object (e.g., a person) was located 0.5 m from the device, and in the right matrix the object was located 6 m from the device. Although there are differences between the two images, there is also a strong resemblance between these matrices, which reflects their common environment. The obtained matrices are collected and used to train an AI model to classify person's distance to the device. If using the raw matrices directly to feed a NN model for proximity prediction, one would usually require a Convolutional Neural Network (CNN) type model to process the matrix shaped data. CNN models are typically expensive due to the usage of many high dimensional filters used to convolve the matrix data.

Figure 2B:
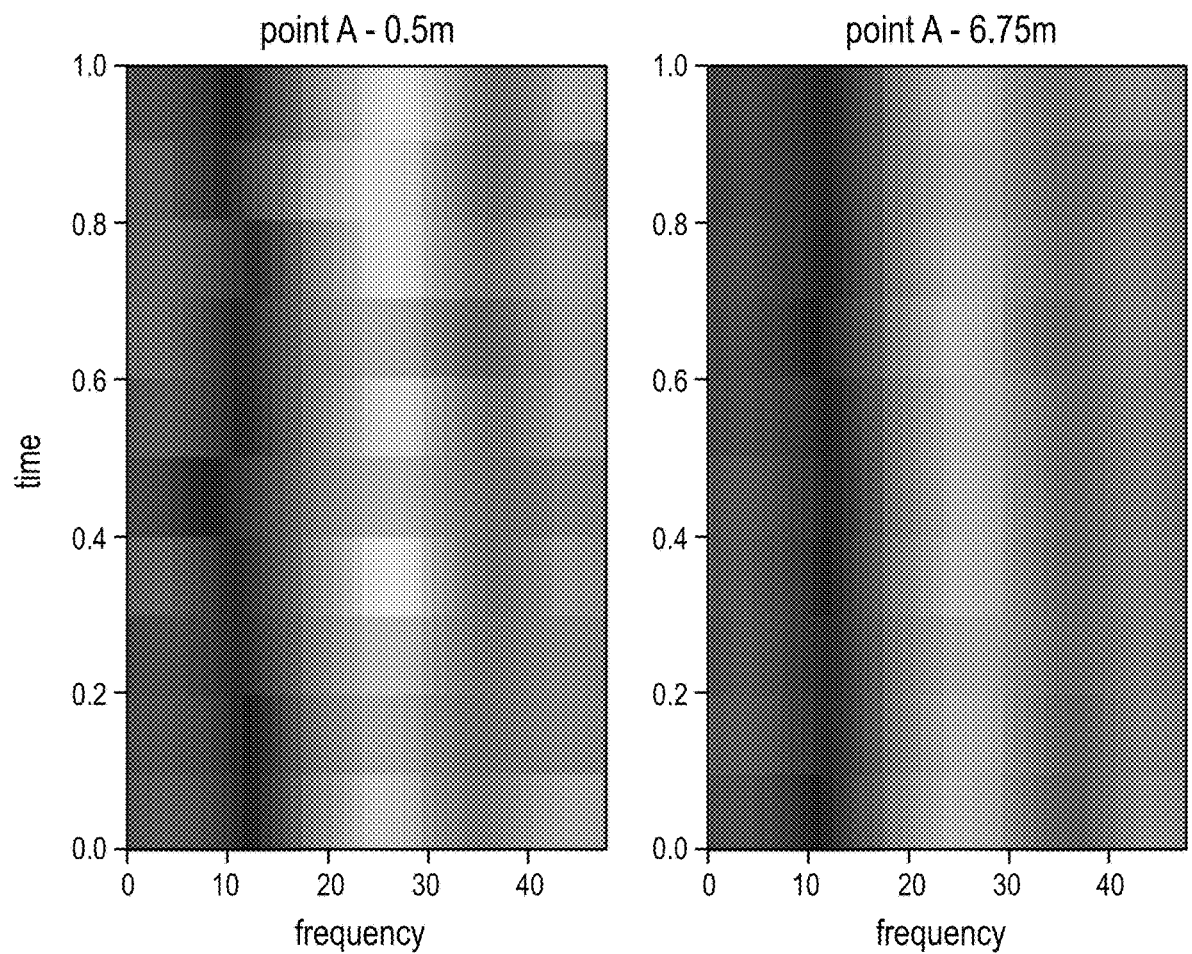

The trained NN/CNN classifier suffers from a generalization problem when being trained with samples from Point 'A' and making an inference on sample collected at new environment, say Point 'B'. It is generally not possible to train a CNN model with all possible environments, therefore it is beneficial to train the model with useful meaningful features which are common and/or correlated to proximity across locations. FIG. 2B shows CSI time-frequency matrices with CSI measurements collected from Point 'B' at 0.5 m & 6.75 m. In comparison to the matrices in FIG. 2A, it can be seen that the measurements show no similarity to the data collected from Point 'A'.

In some conventional systems, removing location specific patterns from the CSI time-frequency data is performed by using the SVD on the collected matrices and reconstructing them while nulling the $1^{st}$ singular value. This method provides matrices suitable for training a CNN model which generalizes well to unseen locations. However, while functional, this approach still requires the usage of a complex CNN model which is expensive in terms of timing and computations both for training stage and inference.

Covariance Matrix+SVD Decomposition for Compact and Proximity Correlated Features Using the raw CSI matrices directly (as is the case with conventional systems) results in a highly location-specific NN model which will not be suitable for proximity detection in new unseen locations. Extracting location independent patterns from the CSI matrices is possible, but still requires the optimization of a CNN model which is expensive in terms of number of parameters, training time and prediction due to the large number of filters and non-linear operations needed.

With embodiments of the present disclosure, by contrast, a small compact vector of proximity correlated features is extracted from the CSI matrices. The extracted features remove the location specific patterns in the data such that a simpler feedforward NN can be used for reliable predictions in unseen locations. Specifically, SVD decomposition is performed on the covariance matrix of each of the collected CSI time-frequency matrix. The singular values vector is then fed to a single hidden layer feedforward NN to optimally combine the singular values for proximity prediction. The temporal activity of each time-frequency matrix H is now summarized in the singular values vector c1 which entries are generally highly correlated to proximity in any environment. Thus, embodiments of this disclosure yield a single vector suitable for proximity detection using a simple NN model.

Mathematical Description

For a given matrix H∈[t, f] with rank t<f, the Covariance matrix of H is defined as: $R=COV(H)=(H-\mu_H)(H-\mu_H)^*$ where $\mu_H$ is the mean of H across the time axis. We then decompose R using the SVD into 3 matrices such that: $R=UDV^*$ where U∈[t, t] is a unitary matrix, D∈[t, t] is a diagonal matrix contains the singular values $\bar{d}=\{d_1, \ldots, d_t\}$ on its diagonal and V∈[t, t] is a unitary matrix. The decompositions can be written as follows: $=\Sigma_{i=1}^{t} d_i u_i v_i^*$. This sum reconstructs R as a sum of 1-rank matrices ordered by the magnitude of the singular values $\{d_1, d_2, d_t\}$ in a descending order.

Figure 3:
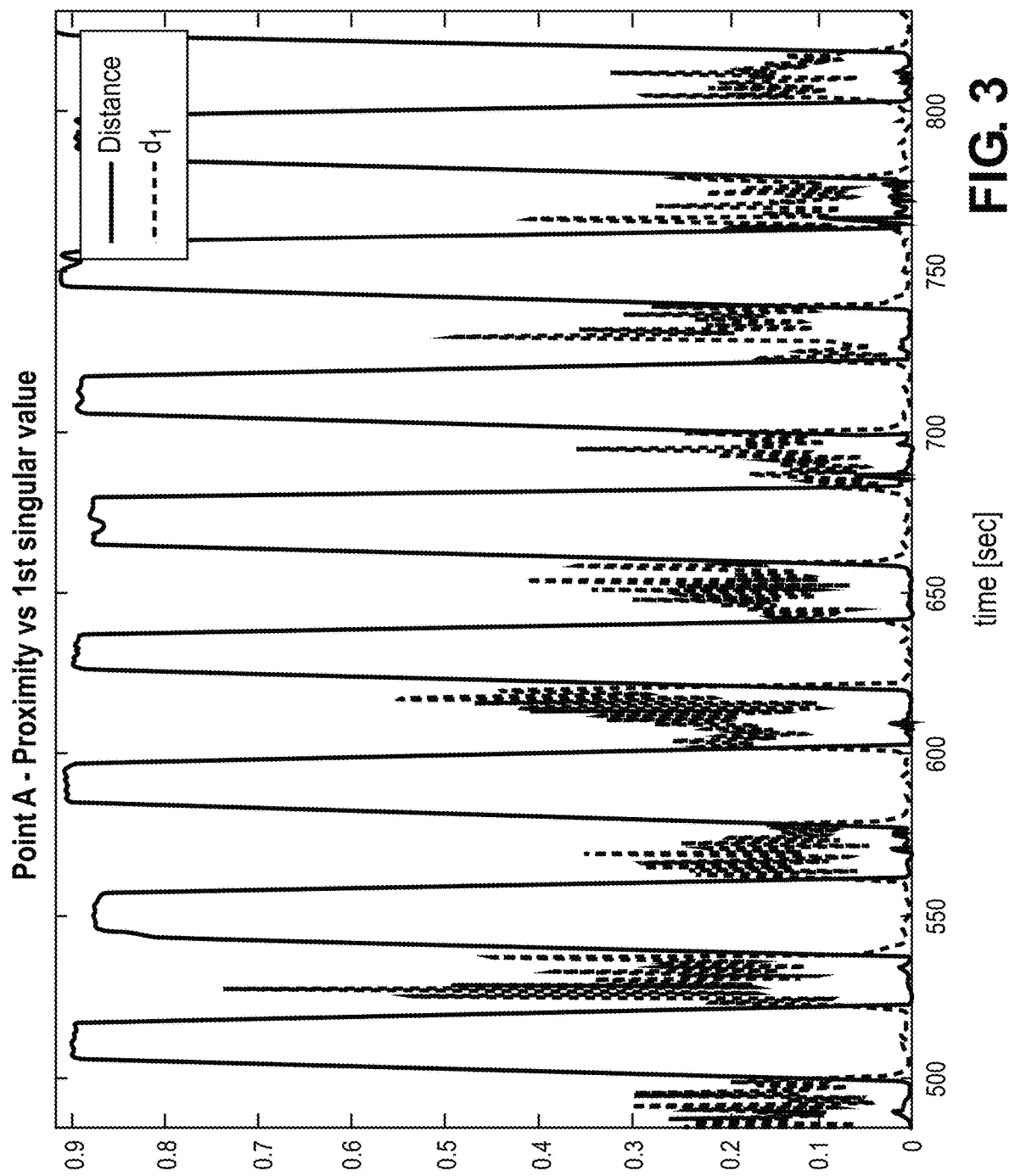
FIGS. 3 and 4 illustrate examples of graphs showing normalized distance vs. a singular value in accordance with some embodiments.
Figure 4:
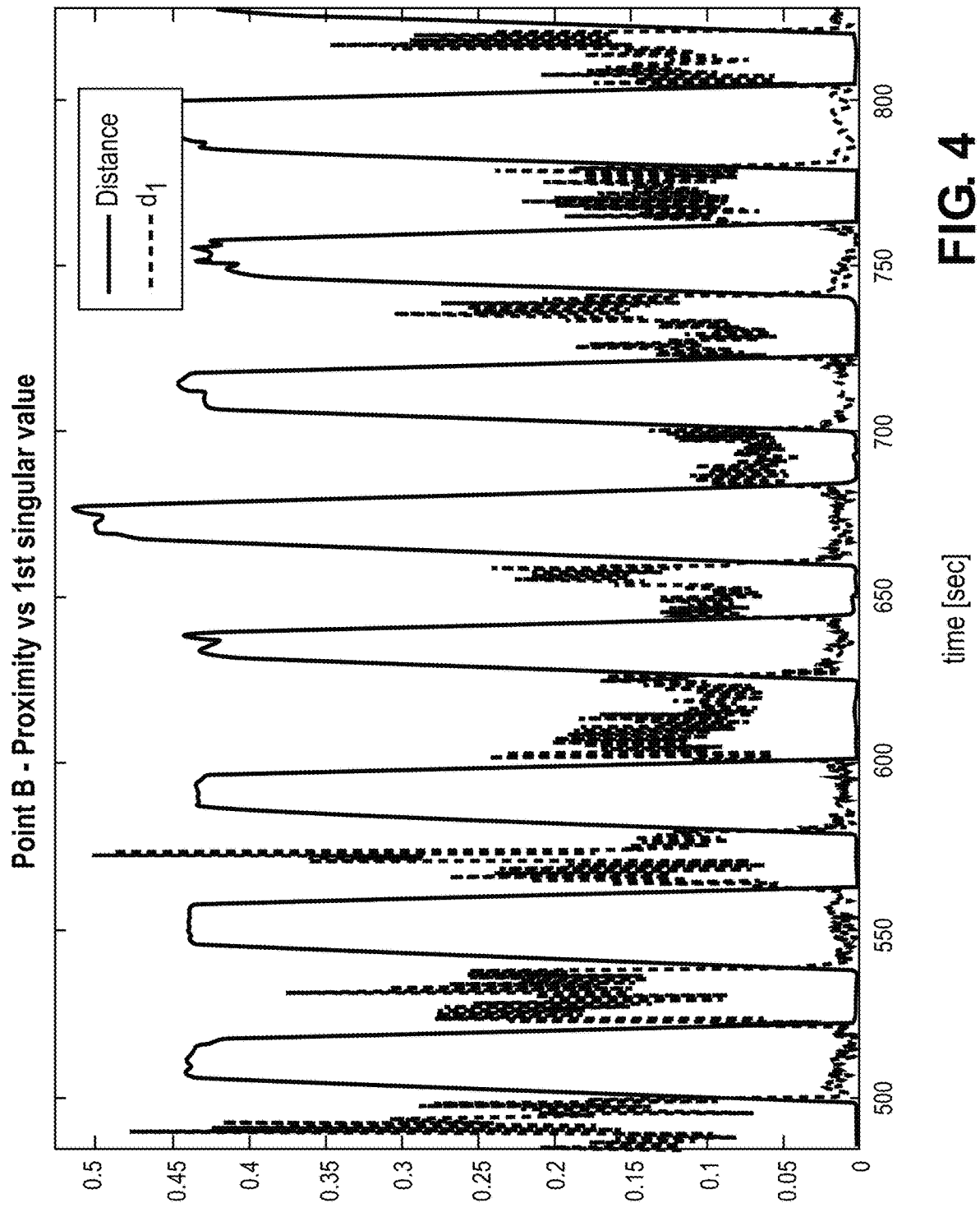
Figure 5:
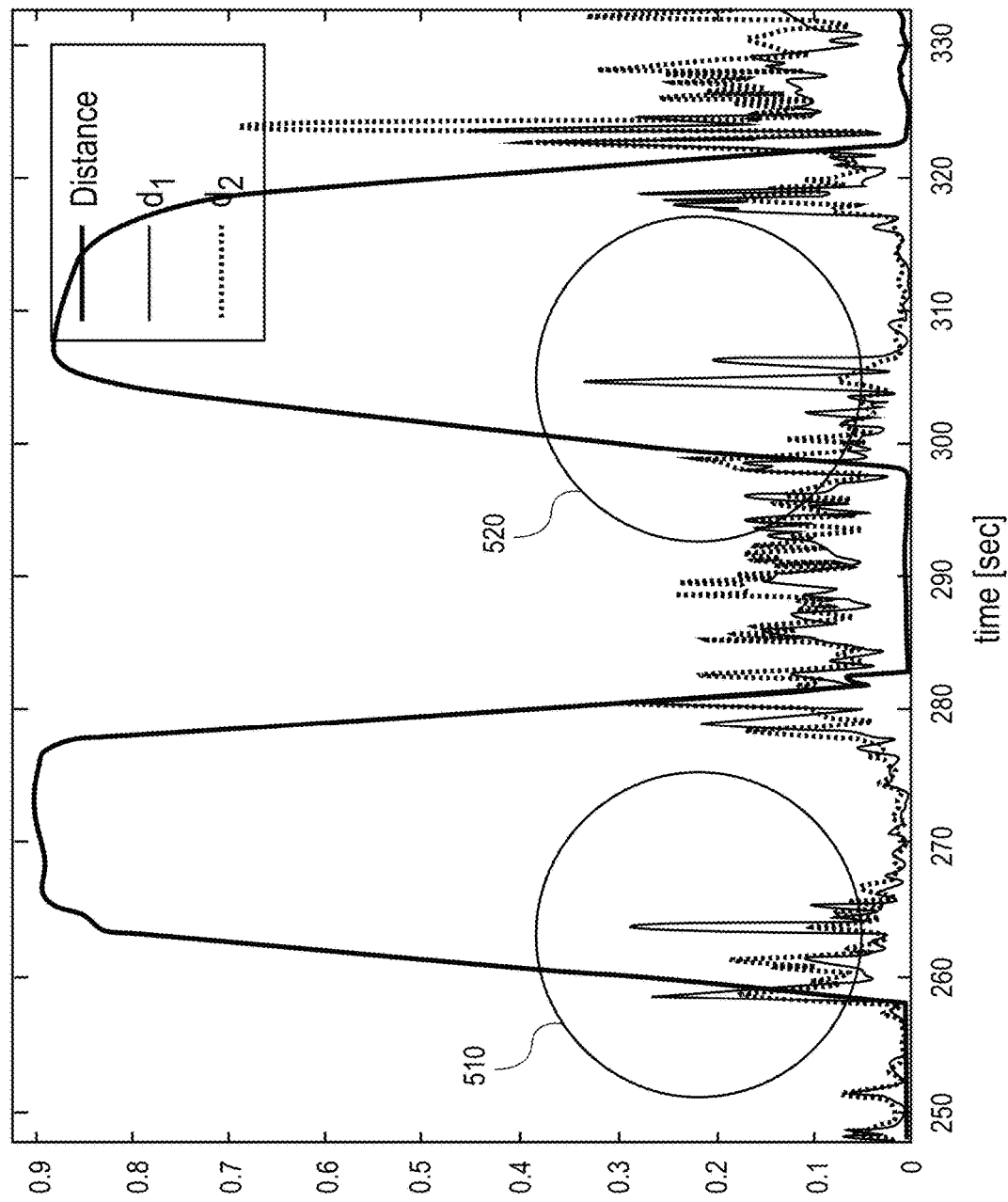
FIG. 5 illustrates an example of a graph showing a normalized distance vs. a first and second singular value in accordance with some embodiments.

FIGS. 3 and 4 illustrate the $1^{st}$ obtained singular value ($d_1$) plotted across time with the recorded distance (normalized) for Points A and B, respectively. As shown in these graphs, the singular value is highly correlated with the proximity. However, though the first singular value may seem well correlated with proximity, it is still not reliable enough on its own to provide high accuracy performances. FIG. 5 shows an example (shown in areas 510 and 520) in which the 1st singular value is active during a none-proximity interval, while the 2nd singular value is more reliable. Accordingly, embodiments may combine the complete singular values vector to obtain a stable reliable metric for proximity detection. In order to come up with the optimal combining, embodiments of this disclosure may utilize a feedforward NN where the singular values vector are provided as an input feature.

Figure 6A:
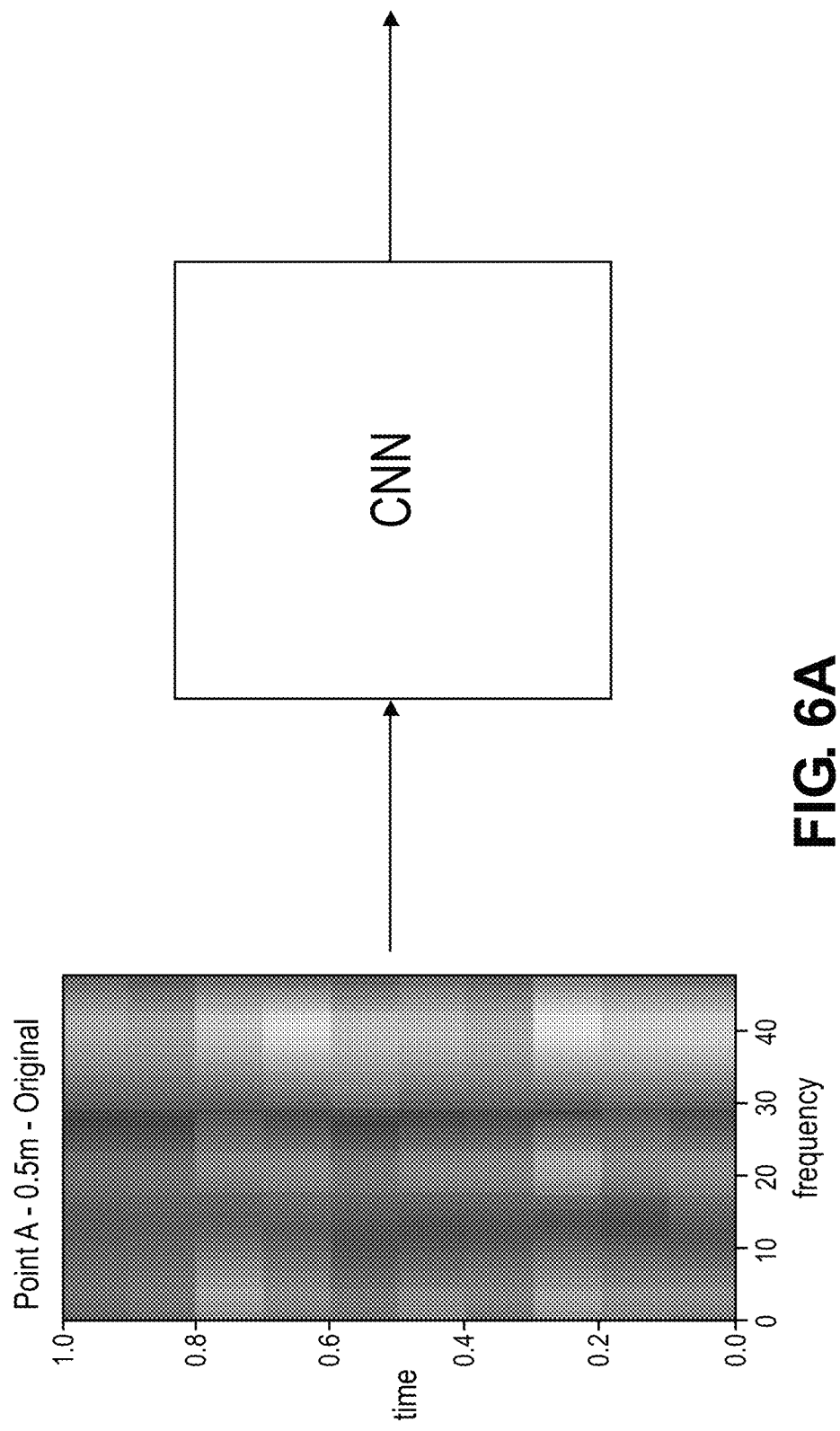
FIGS. 6A, 6B, and 6C illustrate examples of process flows associated processing CSI matrices by neural networks (NNs) in accordance with some embodiments.
Figure 6B:
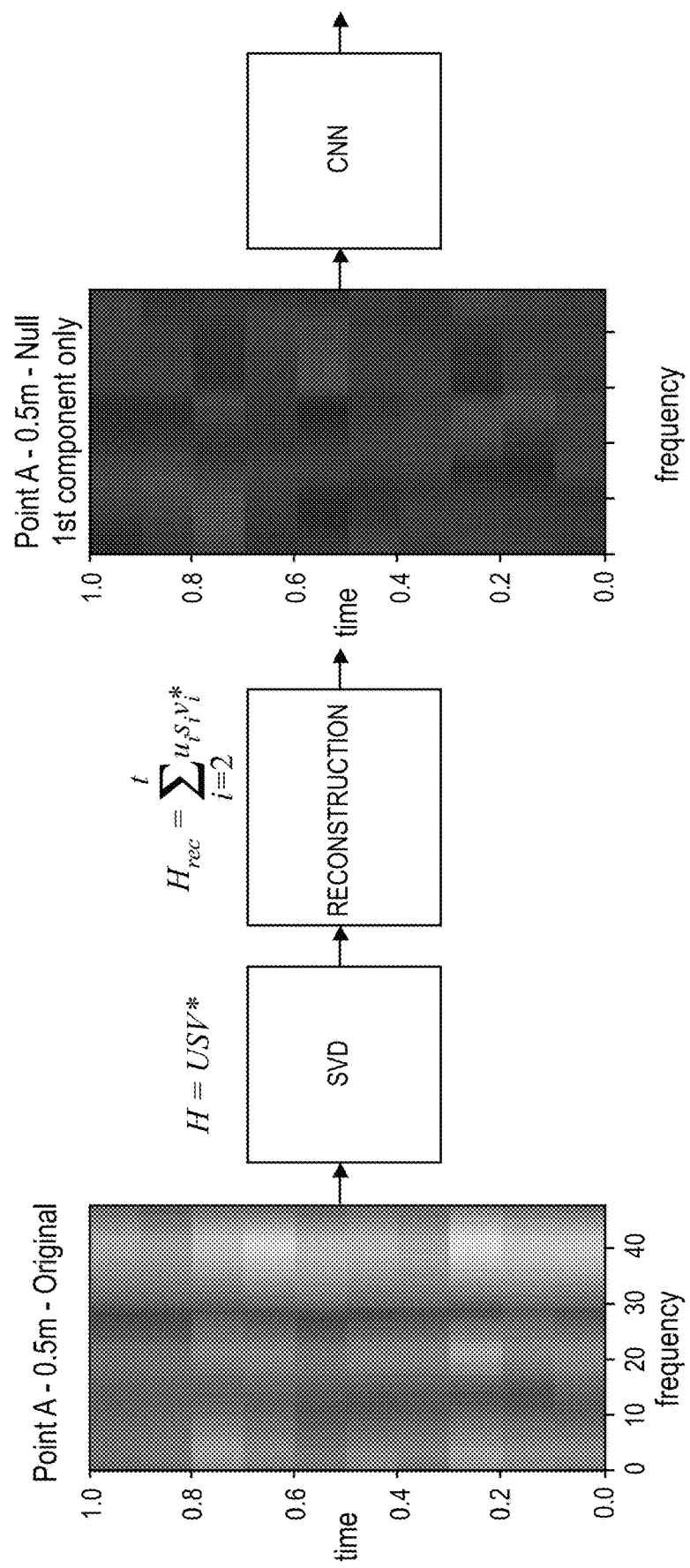
Figure 6C:
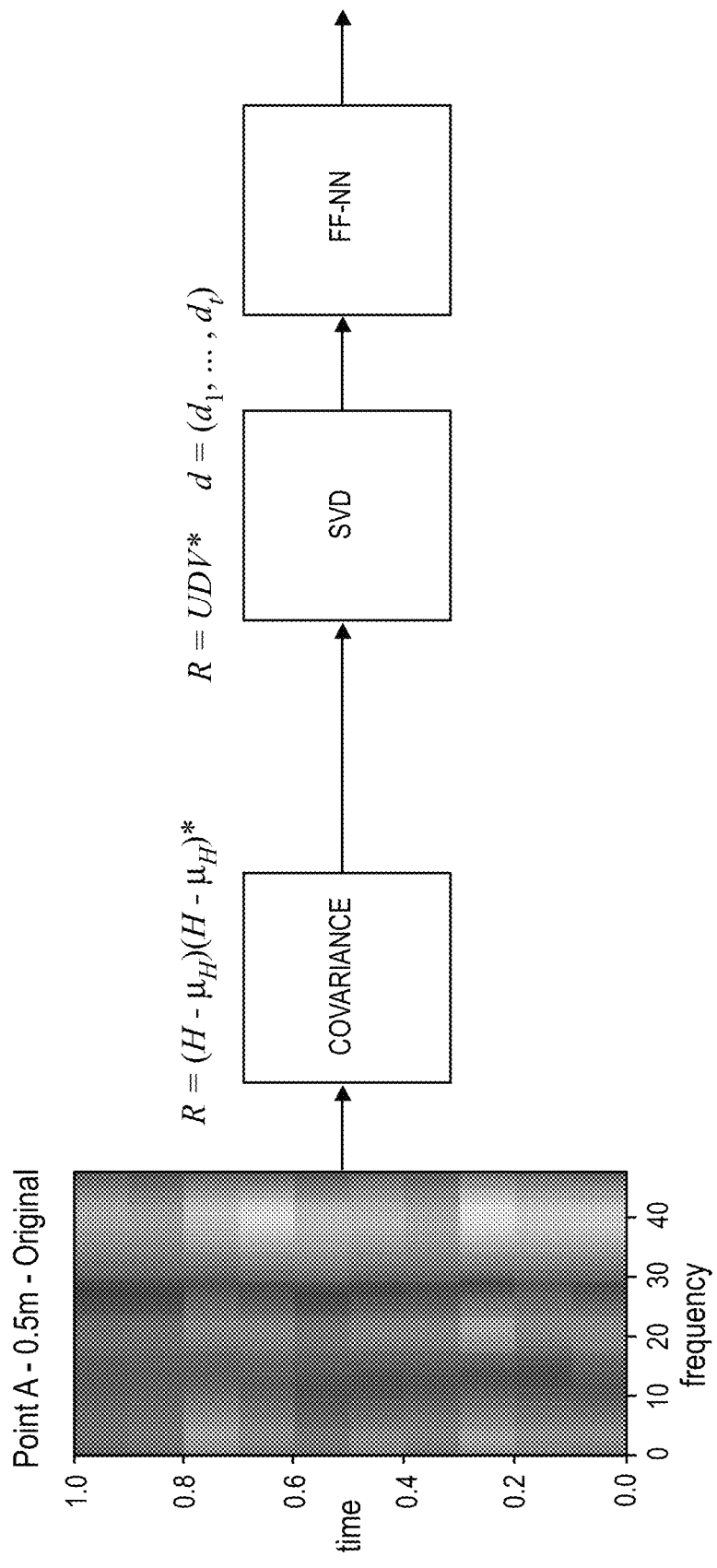

FIGS. 6A, 6B, and 6C illustrate three process flows to determine the proximity of an object for comparison with one another. FIG. 6A illustrates a process whereby raw CSI data is fed to a CNN. FIG. 6B illustrates a process that includes SVD nulling on CSI data fed to a CNN model. In FIG. 6B, an SVD process is first performed on the raw CSI data matrix. Next, the result of the process is then reconstructed to generate the nullified matrix, which is in turn provided to the CNN.

FIG. 6C illustrates a process where a covariance matrix is generated based on the CSI data. Next, the system performs a SVD operation on the covariance matrix to obtain a singular values vector. The singular values vector of the covariance matrix of the CSI data is then provided to a feedforward neural network (FF-NN) model. These processes are referred to below as "Process A," "Process B," and "Process C," respectively.

Eight unseen environments were tested by the inventors using Processes A, B, and C. Throughout the experiments, the strongest AP (according to average measured RSSI) in each location was chosen for providing the raw CSI data, with two distinct APs chosen overall, and denoted as "AP #1" and "AP #2." Training was conducted using AP #1 for all models, and the results are summarized in Table 1 below. The average accuracies for Processes A, B, and C, were 49.1%, 91.48%, and 92.65%, respectively.

TABLE 1

| train data point | AP # | test data point | Accuracy | Precision | Recall | Process |
|---|---|---|---|---|---|---|
| 1 | 2 | 2 | 0.4997 | 0.499 | 0.9898 | A |
| 1 | 2 | 2 | 0.9471 | 0.9144 | 0.9863 | B |
| 1 | 2 | 2 | 0.9505 | 0.9324 | 0.9713 | C |
| 1 | 1 | 3 | 0.469 | 0.4669 | 1 | A |
| 1 | 1 | 3 | 0.9318 | 0.8884 | 0.9759 | B |
| 1 | 1 | 3 | 0.9048 | 0.8774 | 0.9244 | C |
| 1 | 1 | 4 | 0.4794 | 0.4657 | 0.9998 | A |
| 1 | 1 | 4 | 0.9303 | 0.8762 | 0.9858 | B |
| 1 | 1 | 4 | 0.9508 | 0.9522 | 0.9387 | C |
| 1 | 1 | 5 | 0.4979 | 0.4849 | 0.9932 | A |
| 1 | 1 | 5 | 0.8722 | 0.8002 | 0.9724 | B |
| 1 | 1 | 5 | 0.8659 | 0.8223 | 0.9141 | C |
| 1 | 1 | 6 | 0.5638 | 0.5531 | 0.9981 | A |
| 1 | 1 | 6 | 0.8673 | 0.839 | 0.933 | B |
| 1 | 1 | 6 | 0.9072 | 0.9361 | 0.8887 | C |
| 1 | 2 | 7 | 0.6207 | 0.5481 | 0.9994 | A |
| 1 | 2 | 7 | 0.9746 | 0.9565 | 0.9898 | B |
| 1 | 2 | 7 | 0.9723 | 0.9566 | 0.9845 | C |
| 1 | 1 | 9 | 0.4704 | 0.4704 | 1 | A |
| 1 | 1 | 9 | 0.8825 | 0.8116 | 0.9771 | B |
| 1 | 1 | 9 | 0.9607 | 0.9565 | 0.9601 | C |
| 1, 2, 10 | 1 | 11 | 0.3724 | 0.3038 | 0.9927 | A |
| 1, 2, 10 | 1 | 11 | 0.9122 | 0.8028 | 0.9025 | B |
| 1, 2, 10 | 1 | 11 | 0.8997 | 0.7803 | 0.8847 | C |

The results obtained using Process A shows the generalization problem a CNN/NN model suffers when no preprocessing method for removing the location specific dependency is used. These results also show that competitive proximity detection performances can be obtained using a much more efficient NN model in Process C.

While process C is shown above as operating in conjunction with an FF-NN, in alternate embodiments, the process may also be used in conjunction with other types of NNs, including a CNN or a recurrent neural network (RNN).

In some embodiments, the NN may be periodically trained with a wide variety of data/measurements from different environments/locations. By so doing, embodiments of the present disclosure are more robust to unseen locations, though still may be unseen environments in which adaptation/calibration is required to fine-tune the algorithm.

Accordingly, to recalibrate the algorithm associated with a NN, for a new location/deployment, new CSI measurements may be collected when a person is in proximity to a device. This can be done by considering some indication from the system/device (e.g., from the operating system of the device) that the person is currently using the device (e.g., the device may have indicators of when a person is browsing the Internet using the device), hence the system can collect data when it is certain that the person is in proximity to the device.

The system may perform pre-processing steps on the collected CSI data—(e.g., calculate covariance matrix & SVD and obtain singular values vectors $\bar{d}$). The system may then normalize new collected data according to new statistics of the vectors $\bar{d}$. The system may then perform one or more iterations (depending on how much data was collected) of forward pass and backpropagation (of the NN) using new data to update the Neural network (NN) parameters. This process for recalibration may be repeated if/when necessary.

Figure 7:
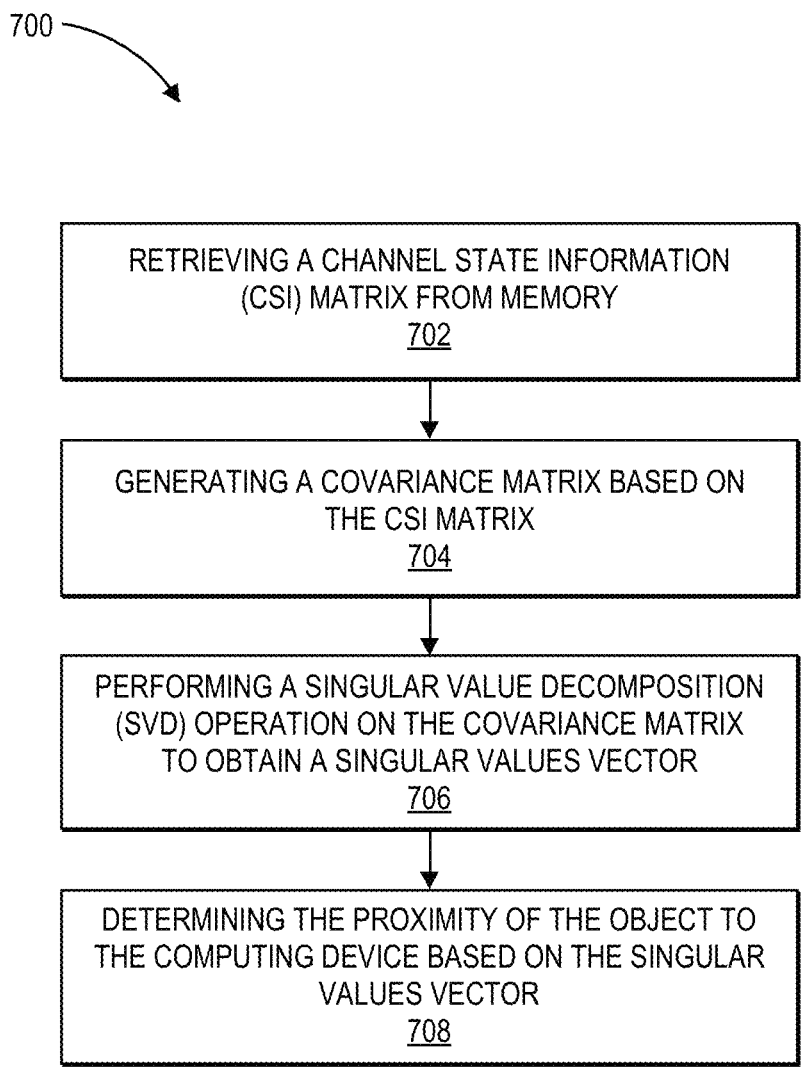
FIGS. 7, 8 and 9 illustrate examples of operation flow/algorithmic structures in accordance with some embodiments.

FIG. 7 illustrates an operation flow/algorithmic structure 700 in accordance with some embodiments. The operation flow/algorithmic structure 700 may be implemented by an access point, for example, access point 104 shown in FIG. 1, or components thereof, for example, the components of AP 1004 shown in FIG. 10. In some embodiments, the operation flow/algorithmic structure 700 may be implemented by a STA device (such as a laptop, personal computer, or mobile computing device) or components thereof.

At 702, the operation flow/algorithmic structure 700 includes retrieving a channel state information (CSI) matrix from memory. For example, the CSI matrix may include one or more indicators associated with a proximity of an object (e.g., a human) to a computing device (e.g., a STA device) such as the CSI matrices for point A and point B illustrated in FIGS. 2A and 2B, respectively. At 704, the operation flow/algorithmic structure 700 further includes generating a covariance matrix based on the CSI matrix. In embodiments where operation flow/algorithmic structure 700 is performed by an AP, the CSI matrix may be received from the computing device and stored in the memory of the AP (e.g., in memory circuitry 1020 shown in FIG. 10).

At 706, the operation flow/algorithmic structure 700 further includes performing a singular value decomposition (SVD) operation on the covariance matrix to obtain a singular values vector. In some embodiments, for example, the SVD operation includes decomposing the CSI matrix into a plurality of matrices, which may include at least one unitary matrix and at least one diagonal matrix. In some embodiments, the singular values vector includes entries correlated to environment-independent proximity of the object to the computing device.

At 708, the operation flow/algorithmic structure 700 further includes determining the proximity of the object to the computing device based on the singular values vector. In some embodiments, the proximity of the object to the computing device is determined based on the singular values vector using a neural network (NN), such as a feedforward NN.

Figure 8:
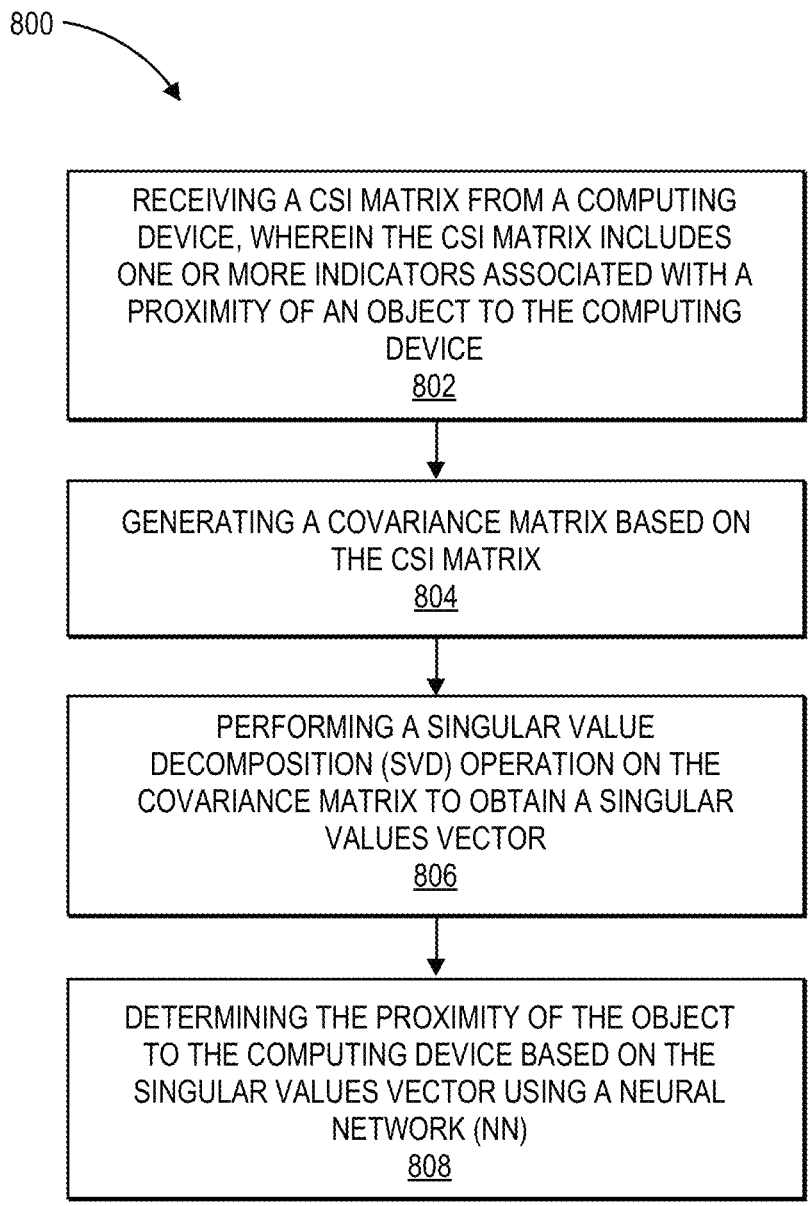

FIG. 8 illustrates an operation flow/algorithmic structure 700 in accordance with some embodiments. The operation flow/algorithmic structure 700 may be implemented by an access point, for example, access point 104 shown in FIG. 1, or components thereof, for example, the components of AP 1004 shown in FIG. 10.

Operation flow/algorithmic structure 800 includes, at 802, receiving a CSI matrix from a computing device, wherein the CSI matrix includes one or more indicators associated with a proximity of an object to the computing device. At 804, the operation flow/algorithmic structure 800 may include generating a covariance matrix based on the CSI matrix. At 806, the operation flow/algorithmic structure 800 may further include performing a singular value decomposition (SVD) operation on the covariance matrix to obtain a singular values vector. At 808, the operation flow/algorithmic structure 800 may further include determining the proximity of the object to the computing device based on the singular values vector using a neural network (NN).

Figure 9:
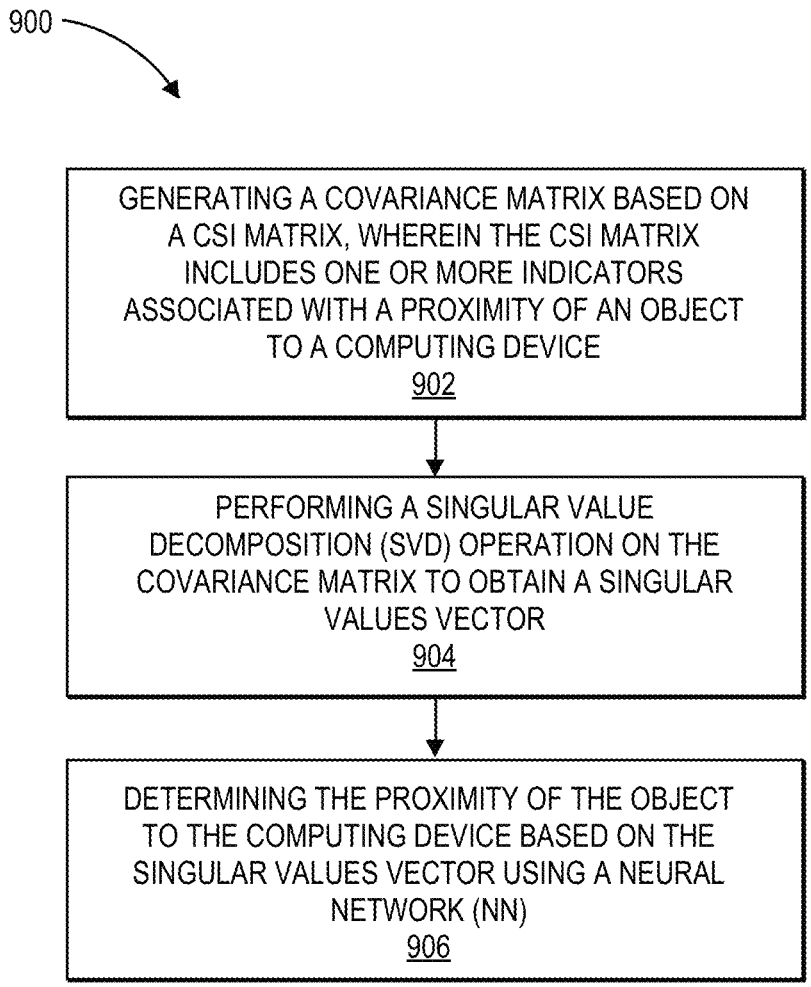

FIG. 9 illustrates an operation flow/algorithmic structure 900 in accordance with some embodiments. The operation flow/algorithmic structure 900 may be implemented by an access point, for example, access point 104 shown in FIG. 1, or components thereof, for example, the components of AP 1004 shown in FIG. 10. In some embodiments, the operation flow/algorithmic structure 900 may be implemented by a STA device (such as a laptop, personal computer, or mobile computing device) or components thereof.

Operation flow/algorithmic structure 900 includes, at 902, generating a covariance matrix based on a CSI matrix, wherein the CSI matrix includes one or more indicators associated with a proximity of an object to the computing device. Operation flow/algorithmic structure 900 includes, at 904, performing a singular value decomposition (SVD) operation on the covariance matrix to obtain a singular values vector. Operation flow/algorithmic structure 900 includes, at 906, determining the proximity of the object to the computing device based on the singular values vector using a neural network (NN).

Figure 10:
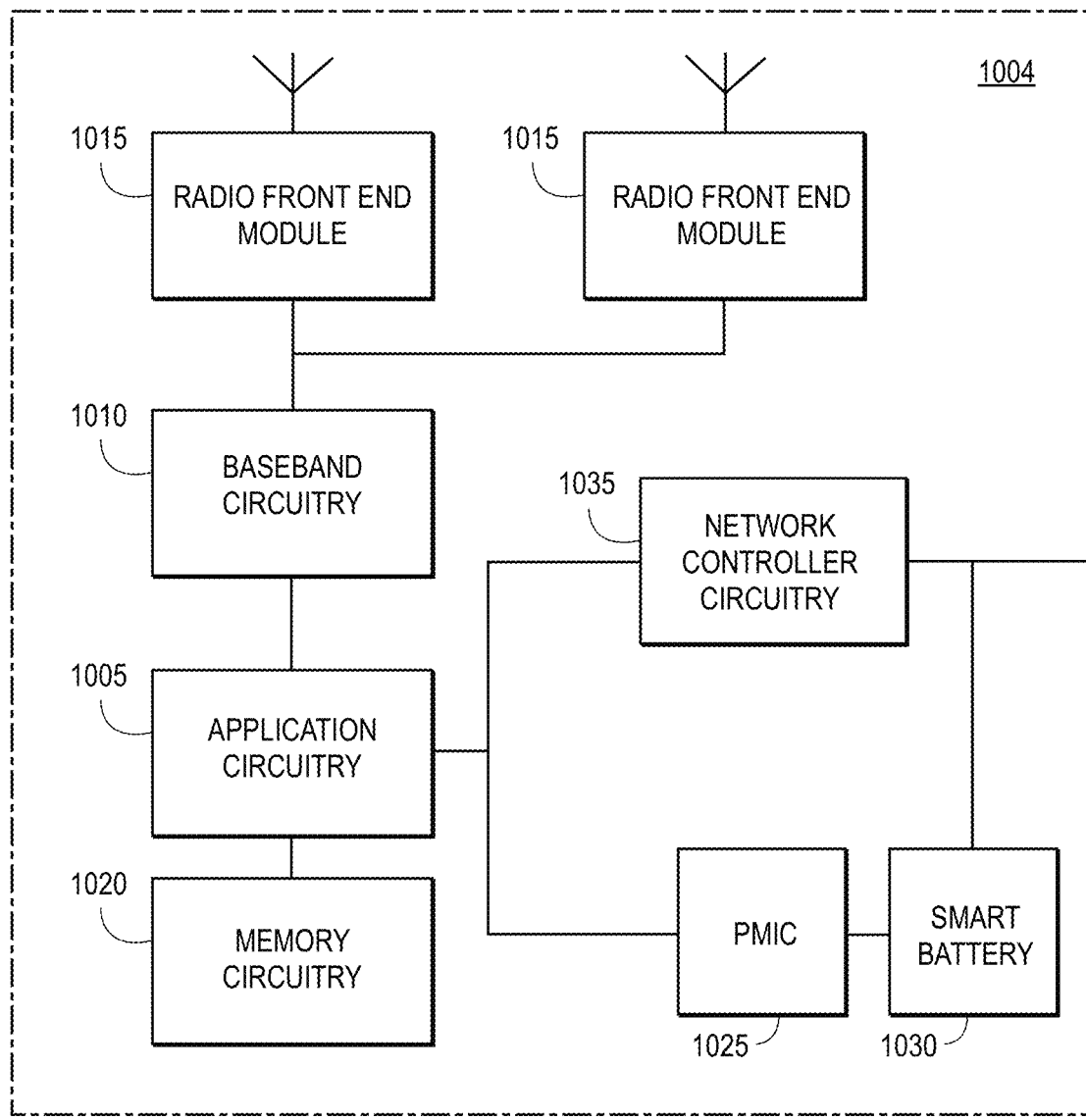
FIG. 10 illustrates an example of an access point (AP) in accordance with various embodiments.

FIG. 10 illustrates an example of an AP (e.g., AP 104 in FIG. 1) in accordance with various embodiments. In this example, the AP 1004 may include one or more of application circuitry 1005, baseband circuitry 1010, one or more radio front end modules 1015, memory circuitry 1020, power management integrated circuitry (PMIC) 1025, and network controller circuitry 1035.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 1005 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 1005 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the AP 104 may not utilize application circuitry 1005, and instead may include a special-purpose processor/controller to process IP data received from an EPC or 7GC, for example.

Additionally or alternatively, application circuitry 1005 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1010 may be implemented, for example, as a solder-down substrate including one or more integrated circuits, a single packaged integrated circuit soldered to a main circuit board or a multi-chip module containing two or more integrated circuits. Although not shown, baseband circuitry 1010 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1010 may include protocol processing circuitry (for example, signal processing circuitry 600) with one or more instances of control circuitry (not shown) to provide control functions for the digital baseband circuitry and/or radio frequency circuitry (e.g., the radio front end modules 1015).

The radio front end modules (RFEM) 1015 may include radio frequency integrated circuits (RFICs), amplifiers (for example, power amplifiers and low-noise amplifiers), and antenna elements to effectuate over-the-air transmissions. The RFEM 1015 may include beamforming circuitry to increase transmission/reception directivity.

The memory circuitry 1020 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 520 may be implemented as one or more of solder down packaged integrated circuits, socketed memory modules and plug-in memory cards.

The PMIC 1025 may include voltage regulators, surge protectors, power alarm detection circuitry, and one or more backup power sources such as a battery or capacitor. The power alarm detection circuitry may detect one or more of brown out (under-voltage) and surge (over-voltage) conditions.

The network controller circuitry 1035 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the access point 104 using a physical connection, which may be electrical (commonly referred to as a "copper interconnect"), optical, or wireless. The network controller circuitry 1035 may include one or more dedicated processors and/or FPGAs to communicate using one or more of the aforementioned protocols. In some implementations, the network controller circuitry 1035 may include multiple controllers to provide connectivity to other networks using the same or different protocols.

The components shown by FIG. 10 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 11:
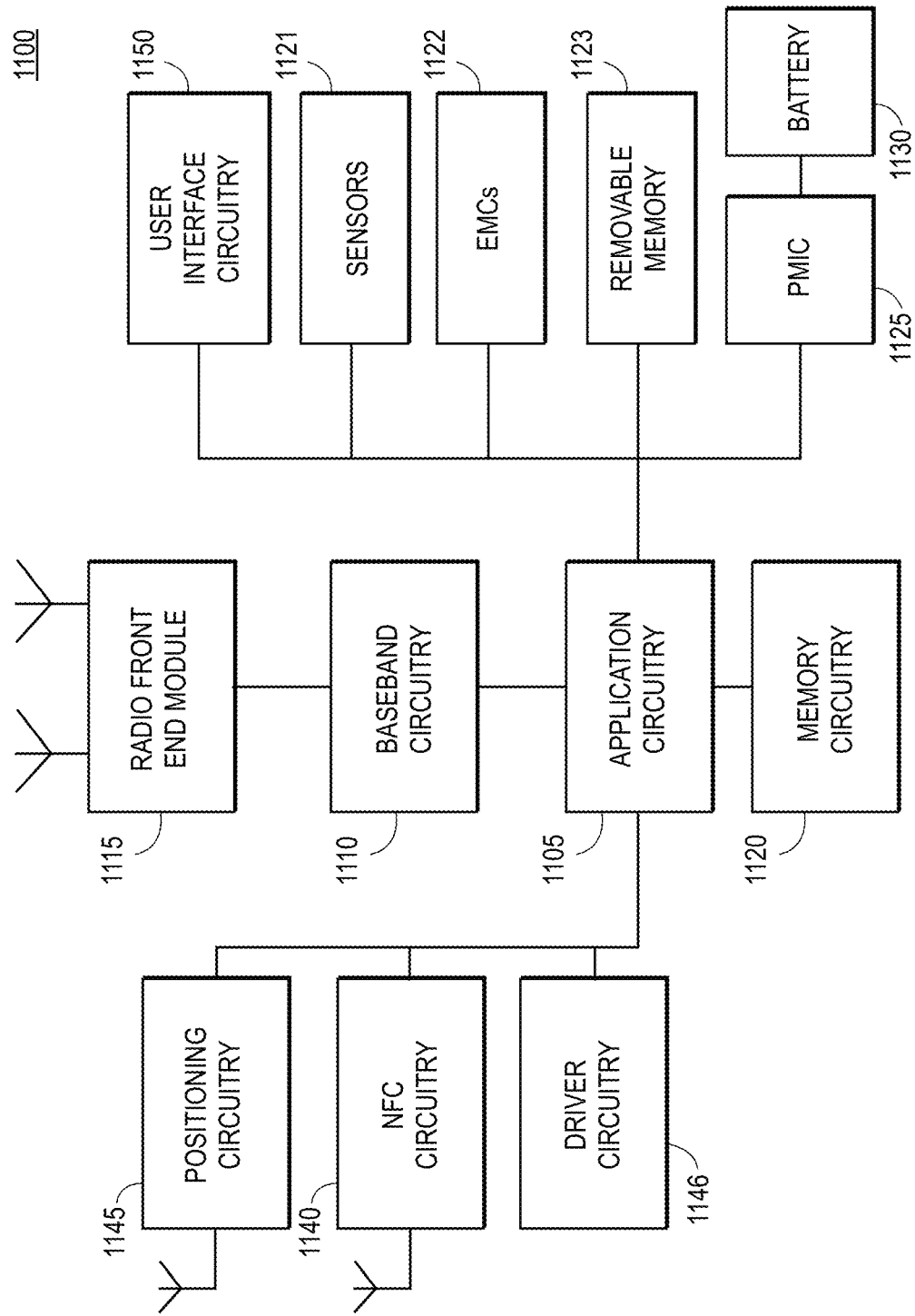
FIG. 11 illustrates an example of infrastructure equipment 1100 in accordance with various embodiments.

FIG. 11 illustrates an example of a platform 1100 (or "device 1100") in accordance with various embodiments. In embodiments, the computer platform 1100 may be suitable for use as STAs 108, 112, 116, of 120, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to execute instructions stored in the memory/storage to enable various applications or operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1105 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1105 may comprise, or may be, a special-purpose processor/controller to operate according to the various embodiments herein.

As examples, the processor(s) of application circuitry 1105 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 1105 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1105 may be a part of a system on a chip (SoC) in which the application circuitry 1105 and other components are formed into a single integrated circuit, or a single package, such as the Edison™ or Galileo™ SoC boards from Intel® Corporation.

Additionally or alternatively, application circuitry 1105 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1105 may comprise logic blocks or logic fabric, and other interconnected resources that may be programmed to perform various functions, such as the procedures, methods, functions, etc. of the various embodiments discussed herein. In such embodiments, the circuitry of application circuitry 1105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1110 may be implemented, for example, as a solder-down substrate including one or more integrated circuits, a single packaged integrated circuit soldered to a main circuit board or a multi-chip module containing two or more integrated circuits.

The RFEMs 1115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1115, which incorporates both mmWave antennas and sub-mmWave.

The memory circuitry 1120 may include any number and type of memory devices used to provide for a given amount of system memory. As examples, the memory circuitry 1120 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1120 may be developed in accordance with a Joint Electron Devices Engineering Council (JEDEC) low power double data rate (LPDDR)-based design, such as LPDDR2, LPDDR3, LPDDR4, or the like. Memory circuitry 1120 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1120 may be on-die memory or registers associated with the application circuitry 1105. To provide for persistent storage of information such as data, applications, operating systems and so forth, memory circuitry 1120 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1100 may incorporate the three-dimensional (3D) cross-point (XPOINT) memories from Intel® and Micron®.

Removable memory circuitry 1123 may include devices, circuitry, enclosures/housings, ports or receptacles, etc. used to couple portable data storage devices with the platform 1100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

The sensor circuitry 1121 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1122 include devices, modules, or subsystems whose purpose is to enable platform 1100 to change its state, position, and/or orientation, or move or control a mechanism or (sub)system. Additionally, EMCs 1122 may be configured to generate and send messages/signaling to other components of the platform 1100 to indicate a current state of the EMCs 1122. Examples of the EMCs 1122 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1100 is configured to operate one or more EMCs 1122 based on one or more captured events and/or instructions or control signals received from a service provider and/or various clients.

In some implementations, the interface circuitry may connect the platform 1100 with positioning circuitry 1145. The positioning circuitry 1145 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1145 may include a Micro-PNT IC that uses a master timing clock to perform position tracking/estimation without GNSS assistance. The positioning circuitry 1145 may also be part of, or interact with, the baseband circuitry 1110 and/or RFEMs 1115 to communicate with the nodes and components of the positioning network. The positioning circuitry 1145 may also provide position data and/or time data to the application circuitry 1105, which may use the data to synchronize operations with various infrastructure (e.g., radio base stations), for turn-by-turn navigation applications, or the like In some implementations, the interface circuitry may connect the platform 1100 with Near-Field Communication (NFC) circuitry 1140. NFC circuitry 1140 is configured to provide contactless, short-range communications based on radio frequency identification (RFID) standards, wherein magnetic field induction is used to enable communication between NFC circuitry 1140 and NFC-enabled devices external to the platform 1100 (e.g., an "NFC touchpoint"). NFC circuitry 1140 comprises an NFC controller coupled with an antenna element and a processor coupled with the NFC controller. The NFC controller may be a chip/IC providing NFC functionalities to the NFC circuitry 1140 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1140, or initiate data transfer between the NFC circuitry 1140 and another active NFC device (e.g., a smartphone or an NFC-enabled POS terminal) that is proximate to the platform 1100.

The driver circuitry 1146 may include software and hardware elements that operate to control particular devices that are embedded in the platform 1100, attached to the platform 1100, or otherwise communicatively coupled with the platform 1100. The driver circuitry 1146 may include individual drivers allowing other components of the platform 1100 to interact with or control various input/output (I/O) devices that may be present within, or connected to, the platform 1100. For example, driver circuitry 1146 may include a display driver to control and allow access to a display device, a touchscreen driver to control and allow access to a touchscreen interface of the platform 1100, sensor drivers to obtain sensor readings of sensor circuitry 1121 and control and allow access to sensor circuitry 1121, EMC drivers to obtain actuator positions of the EMCs 1122 and/or control and allow access to the EMCs 1122, a camera driver to control and allow access to an embedded image capture device, audio drivers to control and allow access to one or more audio devices.

The power management integrated circuitry (PMIC) 1125 (also referred to as "power management circuitry 1125") may manage power provided to various components of the platform 1100. In particular, with respect to the baseband circuitry 1110, the PMIC 1125 may control power-source selection, voltage scaling, battery charging, or DC-to-DC conversion. The PMIC 1125 may often be included when the platform 1100 is capable of being powered by a battery 1130, for example, when the device is included in a mobile computing device.

In some embodiments, the PMIC 1125 may control, or otherwise be part of, various power saving mechanisms of the platform 1100. For example, if the platform 1100 is in an RRC_Connected state, where it is still connected to the RAN node as it expects to receive traffic shortly, then it may enter a state known as Discontinuous Reception Mode (DRX) after a period of inactivity. During this state, the platform 1100 may power down for brief intervals of time and thus save power. If there is no data traffic activity for an extended period of time, then the platform 1100 may transition off to an RRC_Idle state, where it disconnects from the network and does not perform operations such as channel quality feedback, handover, etc. The platform 1100 goes into a very low power state and it performs paging where again it periodically wakes up to listen to the network and then powers down again. The platform 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1130 may power the platform 1100, although in some examples the platform 1100 may be mounted deployed in a fixed location, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

In some implementations, the battery 1130 may be a "smart battery," which includes or is coupled with a Battery Management System (BMS) or battery monitoring integrated circuitry. The BMS may be included in the platform 1100 to track the state of charge (SoCh) of the battery 1130. The BMS may be used to monitor other parameters of the battery 1130 to provide failure predictions, such as the state of health (SoH) and the state of function (SoF) of the battery 1130. The BMS may communicate the information of the battery 1130 to the application circuitry 1105 or other components of the platform 1100. The BMS may also include an analog-to-digital (ADC) convertor that allows the application circuitry 1105 to directly monitor the voltage of the battery 1130 or the current flow from the battery 1130. The battery parameters may be used to determine actions that the platform 1100 may perform, such as transmission frequency, network operation, sensing frequency, and the like.

A power block, or other power supply coupled to an electrical grid may be coupled with the BMS to charge the battery 1130. In some examples, the power block 1130 may be replaced with a wireless power receiver to obtain the power wirelessly, for example, through a loop antenna in the computer platform 1100. In these examples, a wireless battery charging circuit may be included in the BMS. The specific charging circuits chosen may depend on the size of the battery 1130, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1150 includes various input/output (I/O) devices present within, or connected to, the platform 1100, and includes one or more user interfaces designed to enable user interaction with the platform 1100 and/or peripheral component interfaces designed to enable peripheral component interaction with the platform 1100. The user interface circuitry 1150 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1100. The output device circuitry may also include speakers or other audio emitting devices, printer(s), and/or the like. In some embodiments, the sensor circuitry 1121 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1100 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 12:
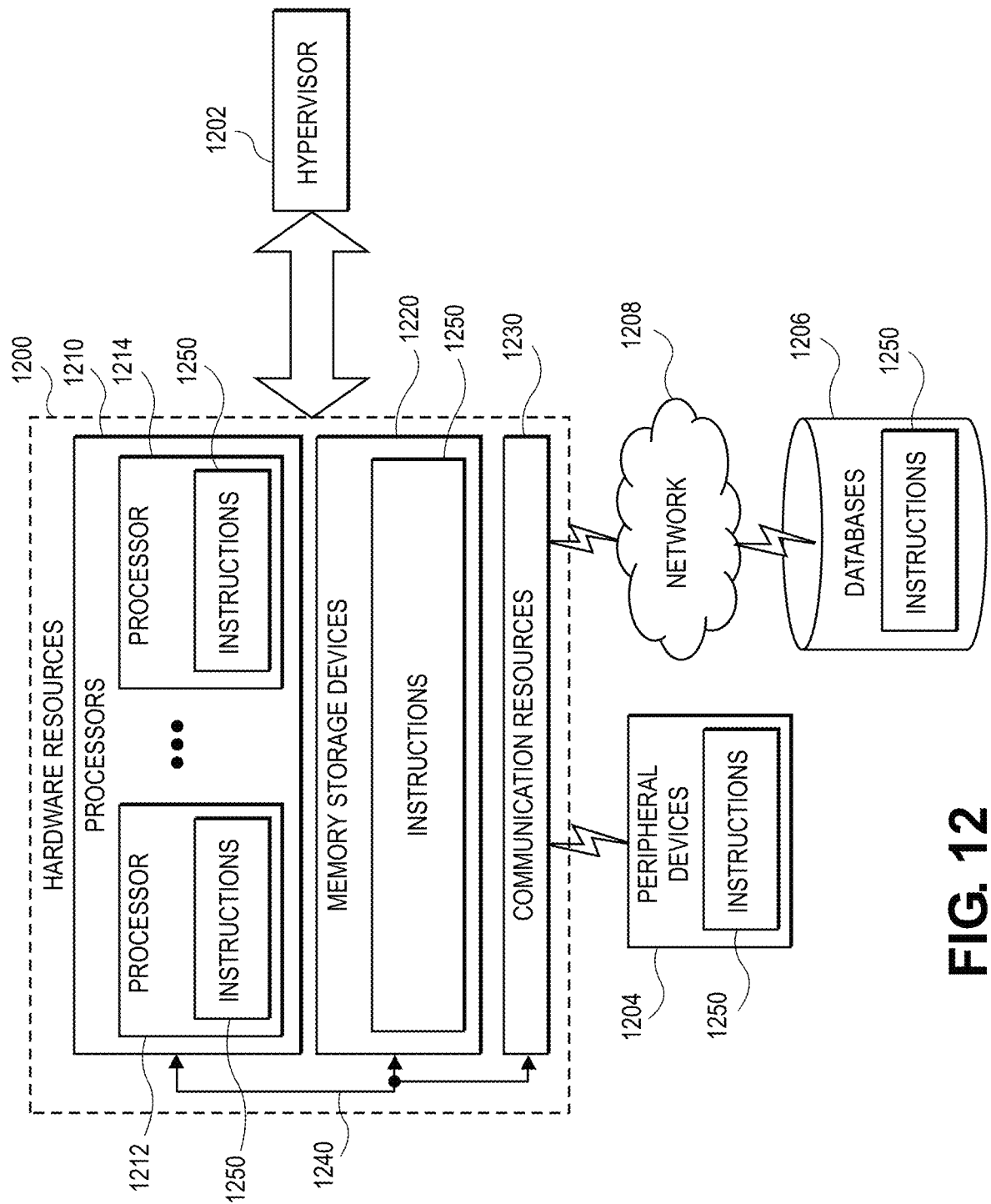
FIG. 12 is a block diagram illustrating components, according to some embodiments, able to read instructions from a machine-readable or computer-readable medium (for example, a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1202 may be executed to provide an execution environment for one or more network slices/sub-slices to utilize the hardware resources 1200. A "virtualized resource" may refer to compute, storage, and/or network resources provided by virtualization infrastructure to an application, device, system, etc.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1214.

The memory/storage devices 1220 may include main memory, disk storage, or any suitable combination thereof. The memory/storage devices 1220 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include an apparatus comprising: memory to store a channel state information (CSI) matrix; and processor circuitry, coupled with the memory, to: retrieve the CSI matrix from the memory, wherein the CSI matrix includes one or more indicators associated with a proximity of an object to a computing device; generate a covariance matrix based on the CSI matrix; perform a singular value decomposition (SVD) operation on the covariance matrix to obtain a singular values vector; and determine the proximity of the object to the computing device based on the singular values vector.

Example 2 may include the apparatus of example 1 or some other example herein, wherein the proximity of the object to the computing device is determined based on the singular values vector using a neural network (NN).

Example 3 may include the apparatus of example 2 or some other example herein, wherein the NN is a feedforward NN.

Example 4 may include the apparatus of example 1 or some other example herein, wherein the SVD operation includes decomposing the CSI matrix into a plurality of matrices.

Example 5 may include the apparatus of example 4 or some other example herein, wherein the plurality of matrices include at least one unitary matrix and at least one diagonal matrix.

Example 6 may include the apparatus of example 1 or some other example herein, wherein the singular values vector includes entries correlated to environment-independent proximity of the object to the computing device.

Example 7 may include the apparatus of example 1 or some other example herein, wherein the apparatus is an access point and the CSI matrix is received from the computing device.

Example 8 may include the apparatus of example 1 or some other example herein, wherein the apparatus is included in the computing device.

Example 9 includes one or more non-transitory computer-readable media storing instructions that, when executed by one or more processors, cause an access point to: receive a CSI matrix from a computing device, wherein the CSI matrix includes one or more indicators associated with a proximity of an object to the computing device; generate a covariance matrix based on the CSI matrix; perform a singular value decomposition (SVD) operation on the covariance matrix to obtain a singular values vector; and determine the proximity of the object to the computing device based on the singular values vector using a neural network (NN).

Example 10 includes the one or more non-transitory computer-readable media of example 9 or some other example herein, wherein the NN is a feedforward NN.

Example 11 includes the one or more non-transitory computer-readable media of example 9 or some other example herein, wherein the SVD operation includes decomposing the CSI matrix into a plurality of matrices.

Example 12 includes the one or more non-transitory computer-readable media of example 11 or some other example herein, wherein the plurality of matrices include at least one unitary matrix and at least one diagonal matrix.

Example 13 includes the one or more non-transitory computer-readable media of example 9 or some other example herein, wherein the singular values vector includes entries correlated to environment-independent proximity of the object to the computing device.

Example 14 includes one or more non-transitory computer-readable media storing instructions that, when executed by one or more processors, are to cause a device to: generate a covariance matrix based on a CSI matrix, wherein the CSI matrix includes one or more indicators associated with a proximity of an object to a computing device; perform a singular value decomposition (SVD) operation on the covariance matrix to obtain a singular values vector; and determine the proximity of the object to the computing device based on the singular values vector using a neural network (NN).

Example 15 includes the one or more non-transitory computer-readable media of example 14 or some other example herein, wherein the NN is a feedforward NN.

Example 16 includes the one or more non-transitory computer-readable media of example 14 or some other example herein, wherein the SVD operation includes decomposing the CSI matrix into a plurality of matrices.

Example 17 includes the one or more non-transitory computer-readable media of example 16 or some other example herein, wherein the plurality of matrices include at least one unitary matrix and at least one diagonal matrix.

Example 18 includes the one or more non-transitory computer-readable media of example 14 or some other example herein, wherein the singular values vector includes entries correlated to environment-independent proximity of the object to the computing device.

Example 19. includes the one or more non-transitory computer-readable media of example 14 or some other example herein, wherein the device is an access point and the CSI matrix is received from the computing device.

Example 20 includes the one or more non-transitory computer-readable media of example 14 or some other example herein, wherein the device is included in the computing device.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a signal in a wireless network as shown and described herein.

Example 28 may include a method of communicating in a wireless network as shown and described herein.

Example 29 may include a system for providing wireless communication as shown and described herein.

Example 30 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus, comprising:
   memory to store a channel state information (CSI) matrix; and
   processor circuitry, coupled with the memory, to:
      retrieve the CSI matrix from the memory, wherein the CSI matrix includes one or more indicators associated with a proximity of an object to a computing device;
      generate a covariance matrix based on the CSI matrix;
      perform a singular value decomposition (SVD) operation on the covariance matrix to obtain a singular values vector, wherein the singular values vector includes entries correlated to an environment-independent proximity of the object to the computing device; and
      determine the proximity of the object to the computing device based on the singular values vector.

2. The apparatus of claim 1, wherein the proximity of the object to the computing device is determined based on feeding the singular values vector to a neural network (NN).

3. The apparatus of claim 2, wherein the NN is a feedforward NN.

4. The apparatus of claim 1, wherein the performing of the SVD operation includes decomposing the CSI matrix into a plurality of matrices.

5. The apparatus of claim 4, wherein the plurality of matrices include at least one unitary matrix and at least one diagonal matrix.

6. The apparatus of claim 1, wherein the apparatus is an access point and the CSI matrix is received from the computing device.

7. The apparatus of claim 1, wherein the apparatus is included in the computing device.

8. One or more non-transitory computer-readable media storing instructions that, when executed by one or more processors, cause an access point to:
- receive a channel state information (CSI) matrix from a computing device, wherein the CSI matrix includes one or more indicators associated with a proximity of an object to the computing device;
- remove location-specific patterns in the CSI matrix, wherein the removing comprises generating a covariance matrix based on the CSI matrix; and performing a singular value decomposition (SVD) operation on the covariance matrix to obtain a singular values vector; and
- determine the proximity of the object to the computing device based on the singular values vector using a neural network (NN).

9. The one or more non-transitory computer-readable media of claim 8, wherein the NN is a feedforward NN.

10. The one or more non-transitory computer-readable media of claim 8, wherein the performing of the SVD operation includes decomposing the CSI matrix into a plurality of matrices.

11. The one or more non-transitory computer-readable media of claim 10, wherein the plurality of matrices include at least one unitary matrix and at least one diagonal matrix.

12. The one or more non-transitory computer-readable media of claim 8, wherein the singular values vector includes entries correlated to a location-independent proximity of the object to the computing device.

13. One or more non-transitory computer-readable media storing instructions that, when executed by one or more processors, are to cause a device to:
- generate a covariance matrix based on a channel state information (CSI) matrix, wherein the CSI matrix includes one or more indicators associated with a proximity of an object to a computing device;
- perform a singular value decomposition (SVD) operation on the covariance matrix to obtain a singular values vector, wherein the singular values vector includes entries correlated to a location-independent proximity of the object to the computing device; and
- determine the proximity of the object to the computing device based on the singular values vector using a neural network (NN).

14. The one or more non-transitory computer-readable media of claim 13, wherein the NN is a feedforward NN.

15. The one or more non-transitory computer-readable media of claim 13, wherein the performing of the SVD operation includes decomposing the CSI matrix into a plurality of matrices.

16. The one or more non-transitory computer-readable media of claim 15, wherein the plurality of matrices include at least one unitary matrix and at least one diagonal matrix.

17. The one or more non-transitory computer-readable media of claim 13, wherein the device is an access point and the CSI matrix is received from the computing device.

18. The apparatus of claim 2, wherein the determining of the proximity is done without re-calibrating parameters of the NN.

19. The apparatus of claim 2, wherein the processor circuitry is to periodically train the NN with data from different environments.

20. The apparatus of claim 2, wherein the processor circuitry is to re-calibrate parameters of the NN.

* * * * *